United States Patent [19]

Molitorisz

[11] 4,270,446
[45] Jun. 2, 1981

[54] BALE FORMING APPARATUS

[76] Inventor: Joseph Molitorisz, 624 81st Ave., NE., Bellevue, Wash. 98004

[21] Appl. No.: 67,187

[22] Filed: Aug. 16, 1979

Related U.S. Application Data

[63] Continuation-in-part of Ser. No. 923,829, Jul. 12, 1978, Pat. No. 4,175,487.

[51] Int. Cl.³ .................. B65B 13/20; B30B 15/32
[52] U.S. Cl. .................................. 100/8; 100/81; 100/100; 100/218
[58] Field of Search ............... 100/100, 218, 8, 80, 100/81, 76, 40; 53/116, 117

[56] References Cited

U.S. PATENT DOCUMENTS

| 51,212 | 11/1865 | Price | 100/80 |
|---|---|---|---|
| 187,814 | 2/1877 | Clemens | 100/80 |
| 400,912 | 4/1889 | Heffley | 100/81 |
| 553,924 | 2/1896 | Little | 100/80 |
| 600,791 | 3/1898 | Kirshman | 100/80 |
| 647,712 | 4/1900 | Werkheiser | 100/80 |
| 648,033 | 4/1900 | Kirshman | 100/81 |
| 648,039 | 4/1900 | Medlin | 100/80 |
| 652,383 | 6/1900 | Calton | 100/80 |
| 654,970 | 7/1900 | Gooch | 100/81 |
| 655,000 | 7/1900 | McLean | 100/81 |
| 668,736 | 2/1901 | Killman | 100/23 X |
| 670,406 | 3/1901 | Kirshman | 100/81 |
| 698,043 | 4/1902 | Neely | 100/81 |
| 705,135 | 7/1902 | Pope | 100/81 |
| 733,849 | 7/1903 | Killman | 100/23 X |
| 751,119 | 2/1904 | Thomas | 100/80 |
| 831,301 | 9/1906 | Ryther | 100/141 |
| 879,639 | 2/1908 | Haynes | 100/80 |
| 902,976 | 11/1908 | Lee | 100/80 |
| 908,676 | 1/1909 | Jones | 100/80 |
| 919,861 | 4/1909 | Haynes | 100/80 |
| 928,563 | 7/1909 | Thoens | 100/80 |
| 931,474 | 8/1909 | Phelps | 100/80 |
| 932,354 | 8/1909 | Thomas | 100/81 |
| 942,443 | 12/1909 | Gallaread | 100/80 |
| 967,478 | 8/1910 | Wood | 100/81 |
| 971,949 | 10/1910 | Wood | 100/81 |
| 971,950 | 10/1910 | Wood | 100/81 |
| 971,951 | 10/1910 | Wood | 100/81 |
| 1,079,683 | 11/1913 | Wood | 100/80 |
| 1,258,848 | 3/1918 | Zachow | 100/81 |
| 3,868,809 | 3/1975 | Bledsoe | 100/80 |

Primary Examiner—Billy J. Wilhite

[57] ABSTRACT

This invention pertains to a bale forming apparatus for making rectangular bales from fibrous materials, such as, agricultural crops and industrial products. The principle mechanism consists of; a bale forming chamber and a feeder-compactor mechanism which perform a reversing oscillating motion relative to each other, depositing, and compressing layers of fibrous material in the bale forming chamber. The successive layers are arranged in a folded manner, in a continuous process, resulting in low power consumption and in high output capacity for the apparatus. This apparatus is especially suited to make large size rectangular bales.

5 Claims, 8 Drawing Figures

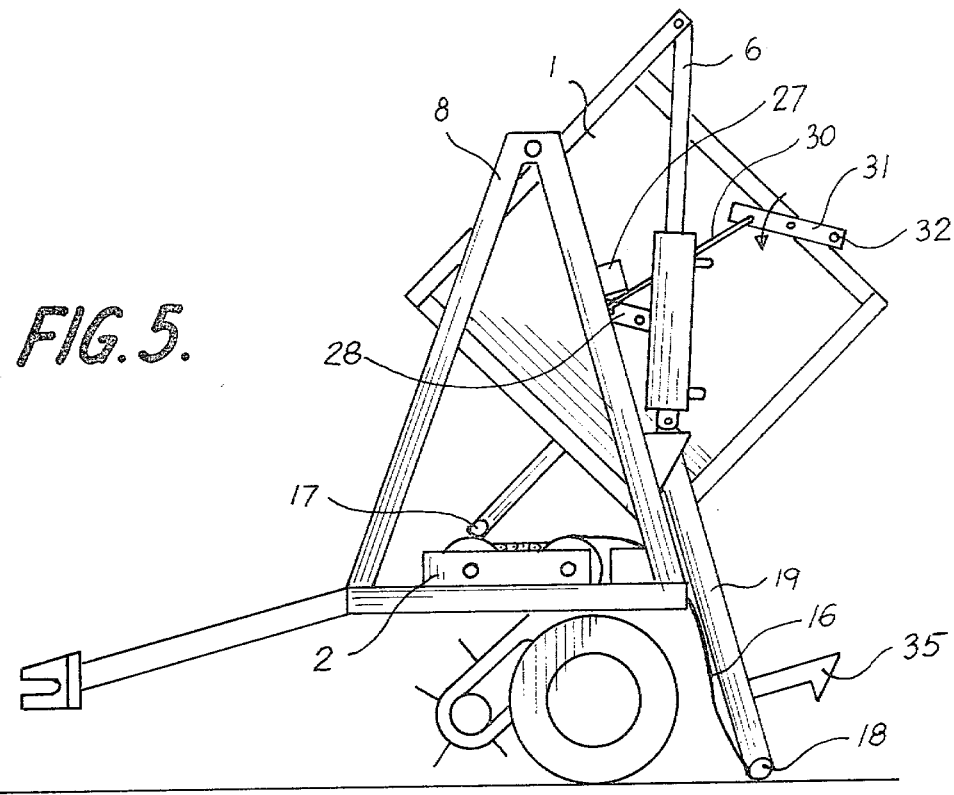
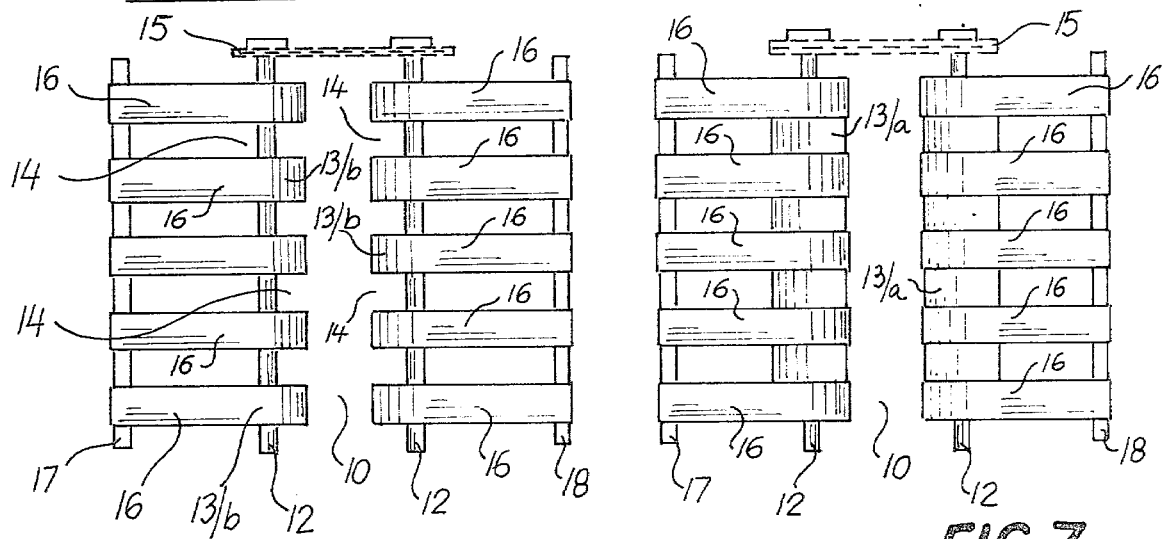
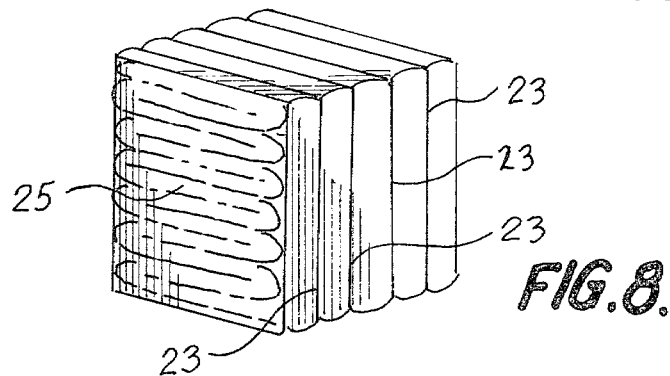

BALE FORMING APPARATUS

This application is a continuation-in-part of my application Ser. No. 923,829, filed 07/12/78 now U.S. Pat. No. 4,175,487.

BACKGROUND OF THE INVENTION

1. Field of the Invention

The recent development and market acceptance of the large cylindrical bale was primarily the result of certain advantages it could provide in the reduction of the overall cost of packaging and handling of hay and other fibrous materials.

However, the cylindrical shape of the bale did not allow its stacking for better utilization of covered storage space and the load area of the truck and trailer beds.

The invented apparatus applies a simple and efficient mechanism to produce large size rectangular bales, which can provide all the advantages of the relatively large size package, and allow their stacking for storage and transportation.

2. Description of Prior Art

The most common type bale forming machines use reciprocating plunger or ram mechanism to compress layers of loose material into bales which are held together by twine or wire. In other known bale forming machines a continuous rolling process is applied producing cylindrical bales.

SUMMARY OF THE INVENTION

The principle aim of my invention is to provide an efficient and simple apparatus for forming relatively large size rectangular bales, requiring low power consumption at high output capacity.

To achieve the desired efficiency and high output capacity the forming of the bales is accomplished in a continuous process.

To achieve the low power consumption and the relatively even power distribution, a compression method is applied which is not characterized by cyclic peak loads followed by idle periods.

The aimed simplicity is achieved through the use of multifunction simple components eliminating the generally necessary complex and interacting sub-systems which have to be fully synchronized for proper operation.

The major and also unique feature of my invention is the functional interrelationship between the bale forming chamber and the feeder-compactor mechanism.

The bale forming chamber and the feeder-compactor mechanism are postioned relative to each other such, that the loose fibrous material received by the feeder-compactor mechanism from a pickup device, or taken directly from a swath becomes partially compressed and is transferred into the bale forming chamber through its open intake port. The feeder-compactor mechanism and the bale forming chamber perform a reversing or oscillating motion relative to each other. This relative oscillating motion may be achieved by causing the motion of the bale forming chamber while holding the feeder-compactor mechanism stationary, or by causing the reversing oscillating motion of the feeder-compactor mechanism while holding the bale forming chamber stationary, or as a third alternative causing both the bale forming chamber and the feeder-compactor mechanism to perform a simultaneous but opposing reversing oscillating motion. During the reversing oscillation relative motion the intake port of the bale forming chamber remains at a close vicinity of the feeder-opening of the feeder-compactor mechanism, allowing the transfer and sufficient distribution of the partially compressed fibrous material over the nearly entire crossection of the bale forming chamber in a continuous process depositing and compressing the fibrous material in subsequent folded-like layers.

The feeder-compactor mechanism consists of; two feeder-compactor roller assemblies which are journally mounted on a common frame with their rotational axis parallel to each other and at a proper distance to form an axially extending feeder-opening between their nearest boundary surfaces. The common frame may be mounted stationary on the structural frame of the apparatus, or it may be allowed to perform the desired reversing oscillating motion relative to the bale forming chamber. The feeder-compactor roller assemblies are interconnected with suitable power transmission means, such as chain or belt, to assure their simultaneous reversing rotational motions in identical directions. The length of the feeder-compactor roller assemblies is approximately the same as the width of the open intake port of the bale forming chamber to allow the transfer of the precompressed fibrous material at the maximum possible width. The extent of the reversing oscillating relative motion between the bale forming chamber and the feeder-compactor mechanism is adjusted to assure sufficient distribution of the precompressed and folded layers of the fibrous material over the largest possible crossectional area of the bale forming chamber.

The feeder-compactor roller assemblies may be composed from several individual cylindrical sections with different diameters to provide passageways for functional components, such as the needles of the tying mechanism, or they may be made from a continuous cylindrical body, securely attached to the corresponding shaft to receive positive rotational drive.

The bale forming chamber is a substantially rectangular container with an open intake port in place of its bottom boundary side. It is journally suspended on the structural frame of the apparatus allowing its pendulum-like like powered swinging motion relative to the feeder-compactor mechanism during the bale forming process. However, in an alternative application the bale forming chamber may be held stationary on the structural frame of the apparatus during the bale forming process, while the reversing oscillating relative motion is provided by the motion of the feeder-compactor mechanism. The reversing oscillating relative motion of both the bale forming chamber and the feeder-compactor mechanism may be in straight line or curve-linear pathes, but in either case the feeder-opening of the feeder-compactor mechanism and the open intake port of the bale forming chamber must remain in sufficiently close vicinity to each other to assure the transfer and deposition of the fibrous material.

The rotational peripheral surface of each of the feeder-compactor roller assemblies, which may be made from several axially extending individual sections with different diameters, or may be made from one axially extending continuous cylindrical body mounted on journally supported shaft, is interconnected with the bale forming chamber by belts. One end of each of the belts is secured to a suitable structural member of the bale forming chamber at or near to its open intake port, which is approximately parallel with the axis of the feeder-compactor roller assemblies. The other end of each belt is wrapped around and secured to the peripheral surface of the feeder-compactor roller assembly nearest to the point of attachment on the bale forming chamber, such as when the oscillating motion of the bale forming chamber is in the direction toward the attachement point of the belt on the bale forming chamber the belts unwrap from that feeder-compactor roller assembly at its upper periphery causing its rotation. Simultaneously those belts attached to the opposite side of the bale forming chamber and to the corresponding feeder-compactor roller assembly become further wrapped around the peripheral surface of the feeder compactor roller assembly as it receives the rotational drive through the chain drive interconnecting the two feeder-compactor roller assemblies. This wrapping and unwrapping action reverses itself when the oscillating motion of the bale forming chamber is in the opposite direction.

The functional roles of the belts are; to partially cover the open intake port of the bale forming chamber thus preventing the exiting if the deposited material, without interfering with the transfer of the fibrous material through the feeder-opening and the open intake port, and to serve as power transmission means to cause the simultaneous and reversing rotational motion of the feeder-compactor roller assemblies as the bale forming chamber or the feeder-compactor mechanism perform their reversing oscillating motions.

To discharge the fully compressed and tied bale the intake port of the bale forming chamber is moved away from the feeder-compactor mechanism by swinging the bale forming chamber toward the rear of the apparatus until it clears all structural members which could interfere with the discharge of the bale. As the bale forming chamber moves toward its discharge position the belts attached to the structural members of the chamber and the feeder-compactor roller assemblies prevent the bale from exiting the chamber. At the discharge position those belts which are secured to the structural member of the bale forming chamber which is located on its rear side, are released allowing the bale to slide out of the bale forming chamber. The release of the belts and the structural member to which they are attached can be made fully automatic by using a latch mechanism which is actuated as the bale forming chamber swings backwards. Similarly, the same latch mechanism can be used to catch the belts and the structural member as the bale forming chamber moves forward.

This bale forming apparatus may be mounted on mobile frame and equipped with pickup mechanism for agricultural field operation, or it may be used in stationary industrial application. The size of the bale forming chamber may vary according to the desired size of the bale. It is, therefore, to be understood that the application of the principles of the bale forming process is not limited by the size of the bale.

The entire operation cycle of the apparatus can be described as follows; the reversing oscillating pendulum like swinging motion of the bale forming chamber is induced by a suitable power drive. The plurality of belts interconnecting the bale forming chamber and the feeder-compactor roller assemblies cause the synchronized reversing rotation of both of the roller assemblies in identical directions resulting in the wrapping and unwrapping of those belts. However, the feeder-opening of the feeder-compactor mechanism remains open at all time performing a reversing oscillating motion relative to the intake port of the bale forming chamber. As the pickup or conveyor delivers the loose fibrous material to the feeder opening of the feeder-compactor mechanism it enters the bale forming chamber through its open intake port. At this point of operation the bale forming chamber is empty, therefore, the upward flow of the loose fibrous material is not restricted. The sufficient width of the feeder-opening allows the flow of the material with a minimum of resistance caused by the rotating feeder-compactor rollers. As the accumulation of the fibrous material continues in the bale forming chamber it becomes distributed over the connecting belts and follows the reversing motion of the bale forming chamber. The newly entering layers of the loose fibrous material are pulled into the chamber by the squeezing interaction of the connecting belts and the already deposited fibrous material. The direction of the entry of the new layers is determined by the direction of the motion of the bale forming chamber, thus depositing them in a continuous folded arrangement over the nearly entire crossection of the bale forming chamber. As the bale forming process progresses the increasing weight of the deposited layers increases the squeezing action on the incoming layers thus increases the aggressiveness of the feeding of the chamber. At the point when the desired density of the bale is reached the delivery of the loose fibrous material to the feeder-opening is interrupted, the forming of the bale completed and it is tied by wire or twine. To discharge the finished bale the bale forming chamber is swung toward the rear of the apparatus. At its discharge position the connecting belts which are secured between the rear feeder-compactor roller assembly and the corresponding structural member of the bale forming chamber are released from their position where they partially cover the open intake port preventing the exiting of the finished bale, allowing the discharge of the bale through the open intake port. The releasing of the belts can be made automatic by using a latch mechanism which is opened by a linkage system as the bale forming chamber swings to the discharge position. After the bale is removed from the chamber the direction of motion of the bale forming chamber is reversed bringing it back to its bale forming position where the open intake port and the feeder opening remain in close vicinity during their reversing oscillating relative motions. During this forward motion of the bale forming chamber the connecting belts and the corresponding structural member are forced back to their closed position where they partially cover the open intake port. After the apparatus is brought back to its bale forming position the flow of the loose fibrous material is induced by the pickup or conveyor thus repeating the cycle.

As an alternative application of the apparatus the power drive, to cause the pendulum-like reversing oscillation motion of the bale forming chamber relative to the feeder-compactor mechanism and the simultaneous reversing rotational motion of the feeder-compactor roller assemblies, may be introduced to the shaft of one of the feeder-compactor roller assemblies. In this application the common frame of the feeder-compactor mechanism remains stationary on the structural frame of the apparatus while the bale forming chamber is allowed to perform its swinging motion. The forces to induce the pendulum like motion of the bale forming chamber are transmitted from the power driven feeder-compactor roller assemblies by the connecting belts which are securely installed on the structural frame of the bale forming chamber and on the feeder-compactor roller assemblies.

In a further alternative application the bale forming chamber is held stationary during the bale forming process while the feeder-compactor mechanism performs a reversing oscillating motion relative to the bale forming chamber. The transfer and deposition of the folded layers of the fibrous material is the same as described above. To discharge the finished bale the bale forming chamber is swung in the position where after the release of the connecting belts between the feeder-compactor roller assemblies and the bale forming chamber, the bale is allowed to slide out.

In a still further alternative application of the apparatus both the bale forming chamber and the feeder-compactor mechanism perform simultaneous but opposing reversing oscillating motions. The close vicinity of the open intake port of the bale forming chamber and the feeder-opening of the feeder-compactor mechanism is maintained during the bale forming process to allow the transfer and deposition of the folded layers of the fibrous material.

BRIEF DESCRIPTION OF THE DRAWINGS

FIG. 5 is a side elevation of the apparatus in its mobile configuration having the bale forming chamber in its discharge position.

FIG. 6 is a top view of the feeder-compactor mechanism with the feeder-compactor roller assemblies composed from individual cylindrical sections which are separated by interspaces.

FIG. 7 is a top view of the feeder-compactor mechanism with the feeder-compactor roller assemblies composed from single continuous cylindrical bodies.

FIG. 8 is an isometric view of a finished and tied bale.

DESCRIPTION OF THE PREFERRED EMBODIMENT

Figure 1:
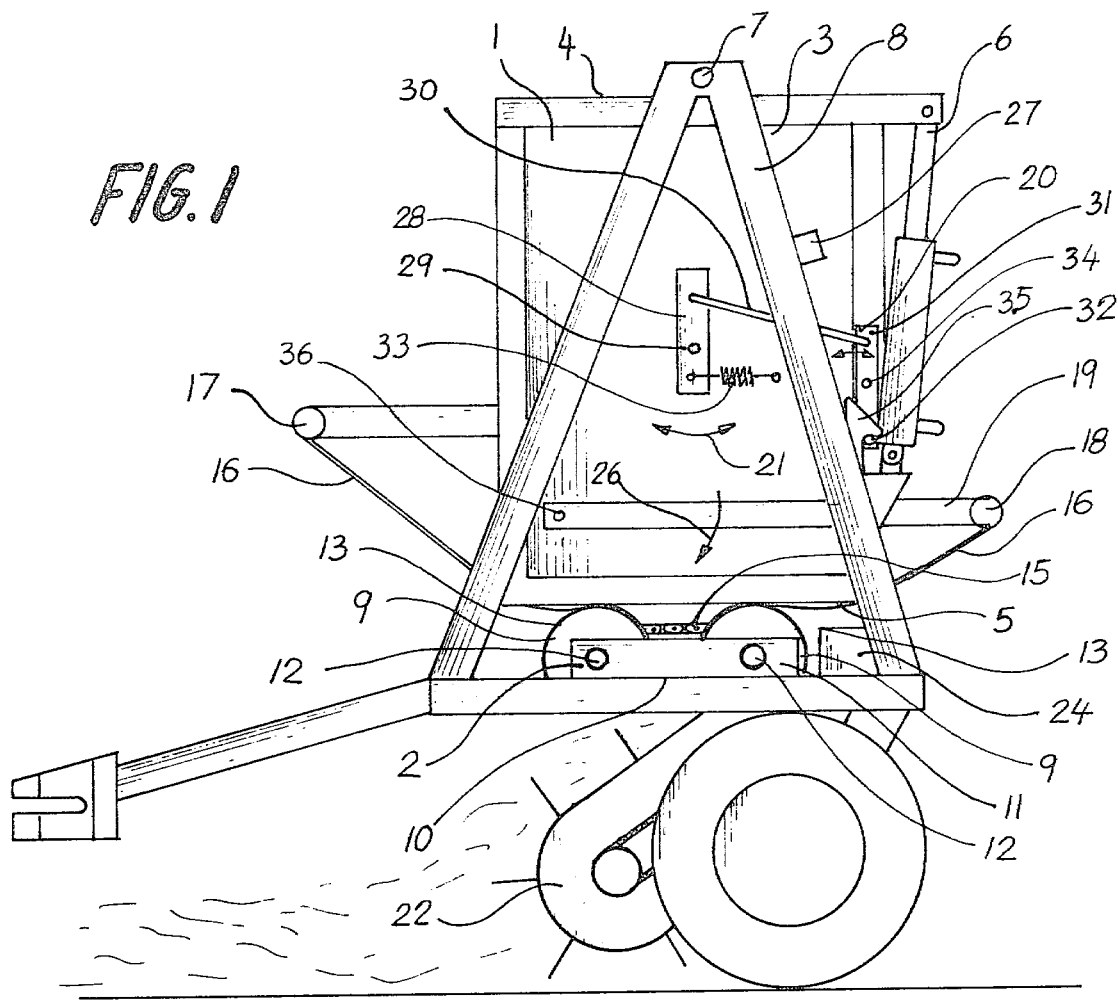
FIG. 1 is a side elevation of the apparatus in its mobile configuration where the bale forming chamber performs a pendulum like reversing oscillating motion relative to the stationary feeder-compactor mechanism.

Generally stated, this invention may be applied to mobile or stationary apparatus having its own power source or being driven by power units, such as tractors.

The bale forming apparatus shown on FIG. 1, FIG. 2, FIG. 3 and FIG. 4 comprise the bale forming chamber (1) and the feeder-compactor mechanism (2). The bale forming chamber is confined by four side walls (3) one closed end (4) and one open intake port (5), which is its bottom boundary.

For illustration purposes one hydraulic cylinder (6) is shown on FIG. 1 which is used to cause the pendulum-like reversing oscillating swinging motion of the bale forming chamber about its pivotal axis (7) on the structural frame (8) of the apparatus during the bale forming process. The same cylinder (6) may be used to move the bale forming chamber to its discharge position, as shown on FIG. 5.

The journally supported feeder-compactor roller assemblies (9) are mounted on a common frame (11) which is securely attached to the structural frame (8) of the apparatus holding the feeder-compactor rollers parallel to each other and perpendicular to the direction of the reversing oscillating motion of the bale forming chamber (1). The feeder-opening (10) is confined by the adjacent boundaries of the feeder-compactor roller assemblies (9). The feeder-compactor mechanism is positioned relative to the bale forming chamber (1) to allow the transfer of the loose fibrous material.

Each of the feeder-compactor roller assemblies (9) consists of; a shaft (12) on which an axially extending and substantially cylindrical roller body (13) is keymounted to assure positive rotational drive. The roller body may be made from one single cylindrical section (13/a) as shown on FIG. 7 or it may be assembled from a plurality of individual sections (13/b) forming a quasi-cylindrical body on which the individual cylindrical sections are separated from each other by properly selected interspaces (14) as shown on FIG. 6. The shafts (12) are interconnected by suitable power transmission means, such as chain (15) to assure the simultaneous rotational motion of both roller assemblies (9) in identical directions.

The width of the interspaces (14) separating the individual sections (13/b) of the feeder-compactor roller assemblies is made to be sufficient to provide passageways for such components as the needles of the tying mechanism (24).

Each of the feeder-compactor roller assemblies is connected to the bale forming chamber by flexible members such as chains or belts (16), as shown on FIG. 1, FIG. 2, FIG. 3, FIG. 4, FIG. 6, FIG. 7. One end of each of the belts (16) connecting the pivotally suspended structural member (18) of the bale forming chamber and the feeder-compactor roller assembly (9) which is located toward the rear of the apparatus is secured to the structural member (18) while the other end is wrapped around and secured to the peripheral surface of the corresponding feeder-compactor roller assembly. Those belts (16) connecting the structural member (17) of the bale forming chamber (1) and the feeder-compactor roller assembly (9) which is located toward the front of the apparatus, are similarly secured to the structural member (17) and the feeder-compactor roller assembly (9). The direction of the wrapping of the belts (16) is such that they depart from the peripheral surface of the feeder-compactor roller assemblies at their upper boundaries extending toward the corresponding structural members (17) and (18). The length of the belts (16) and the number of wrappings on the feeder-compactor roller assemblies (9) has to be sufficient to allow the desired reversing oscillating motion of the bale forming chamber (1) and to assure the generation of the reversing rotational motion of the feeder-compactor roller assemblies. The pendulum-like reversing oscillating swinging motion of the bale forming chamber is shown by the arrow (21).

The belts (16) may be replaced with properly selected chains or ropes.

The latch mechanism (20) which holds the linkage system (19) and the structural member (18) in their upper position as shown on FIG. 1, FIG. 2, FIG. 3, FIG. 4, operates as follows; The linkage system (19) is pivotally attached to the bale forming chamber (1) by a pin (36), allowing the structural member (18) to move in an arc in front of the open intake port of the bale forming chamber when it is in its discharge position as shown on FIG. 5. The linkage system (19) has a hook (35) which engages the locking pin (32) of the lever (31) which is pivotally mounted on the bale forming chamber, holding the linkage (19) in its upper position. The release arm (28) which is pivotally mounted (29) on the bale forming chamber (1) is connected to the lever (31) by a connecting rod (30). As the bale forming chamber reaches its discharge position the release arm (28) engages the block (27) which is securely attached to the structural frame (8) of the apparatus causing the arm (28) to move. The connecting rod (30) transmits this movement to the lever (31) causing it to rotate about its pivotal axis (34) and thus resulting in the disengagement of the locking pin (32) from the hook (35), allowing the linkage system (19) to move in the direction shown by the arrow (26). When the bale forming chamber (1) is moved back to its bale forming position the linkage system (19) is forced to its upper or closed position where the hook (35) and the locking pin (32) becomes positively engaged under the action of the return spring (33) of the release arm (28).

Figure 2:
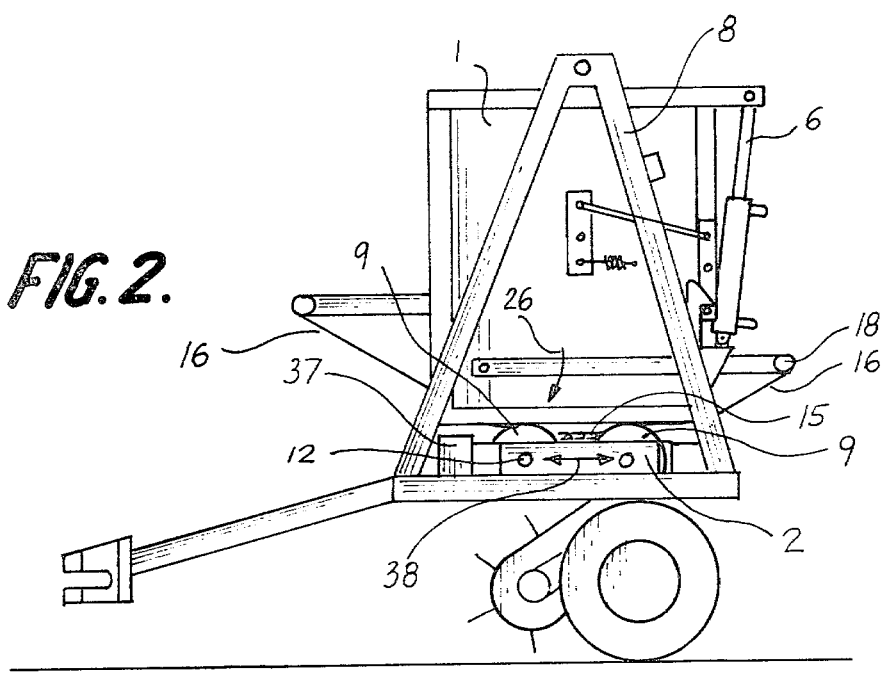
FIG. 2 is a side elevation of the apparatus in its mobile configuration where the bale forming chamber is held stationary during the bale forming process while the feeder-compactor mechanism performs a reversing oscillating motion relative to the bale forming chamber.

In the alternative application of the apparatus as shown on FIG. 2 the bale forming chamber (1) remains stationary during the bale forming process, while the feeder-compactor mechanism (2) performs a reversing oscillating motion relative to the bale forming chamber. In this configuration the feeder-compactor mechanism is movably mounted on the structural frame (8) of the apparatus and its motion is induced by suitable power transmission means (37). The bale forming chamber (1) is moved to its discharge position by the hydraulic cylinder (6). The reversing oscillating motion of the feeder-compactor mechanism (2) is shown by the arrow (38).

Figure 3:
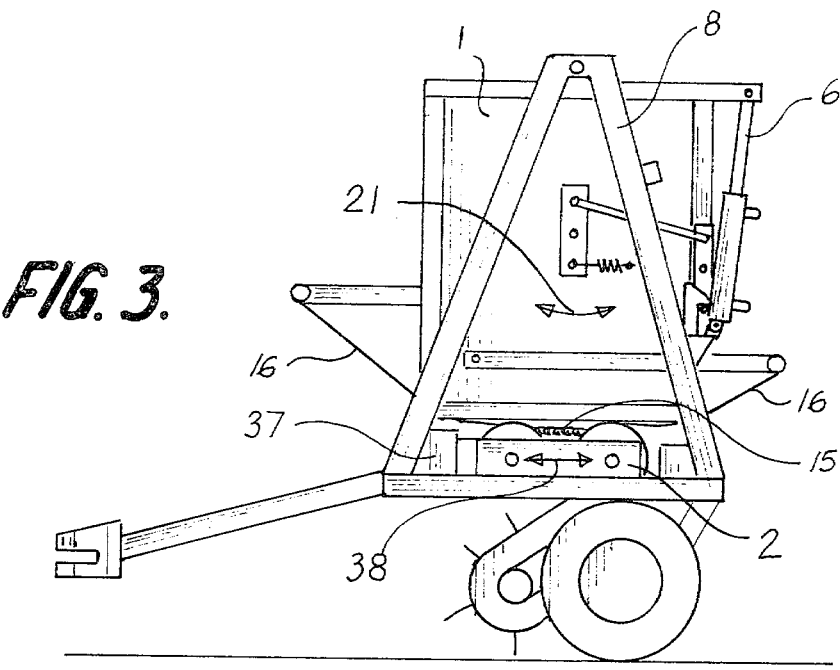
FIG. 3 is a side elevation of the apparatus in its mobile configuration where both the bale forming chamber and the feeder-compactor mechanism perform a simultaneous but opposing reversing oscillating motions.

In another alternative application, as shown on FIG. 3, both the bale forming chamber (1) and the feeder-compactor mechanism (2) perform simultaneous but opposing reversing oscillating motions shown by the arrows (21) and (38). In this configuration of the apparatus the feeder-compactor mechanism is movably mounted on the structural frame (8) and its reversing oscillating motion is induced by suitable power transmission means (37). The pendulum-like reversing oscillating motion of the bale forming chamber (1) is caused by the hydraulic cylinder (6), which is also used to move the bale forming chamber to its discharge position.

Figure 4:
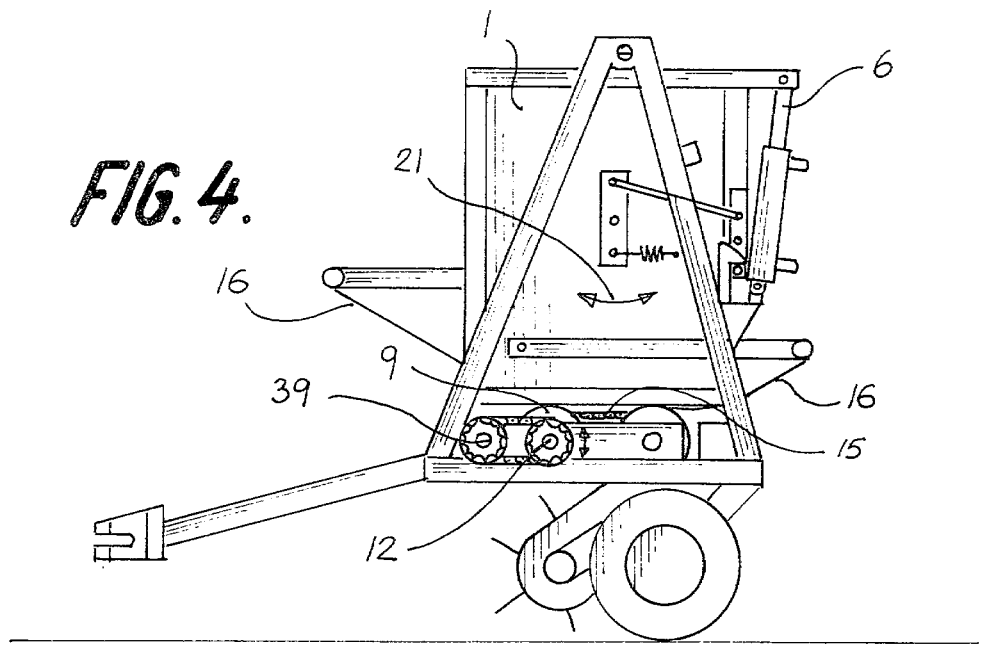
FIG. 4 is a side elevation of the apparatus in its mobile configuration where the power drive is introduced to the shaft of one of the feeder-compactor roller assemblies.

As an alternative power drive for the apparatus, shown on FIG. 4, a suitable power transmission means (39) is introduced which transmits the reversing rotational drive to the shaft (12) of one of the feeder-compactor roller assemblies (9). The forces to cause the pendulum-like reversing oscillation motion of the bale forming chamber (1) are transmitted by the connecting belts (16). To move the bale forming chamber (1) to its discharge position, shown on FIG. 5., the hydraulic cylinder (6) is used.

The fully compressed bale (25) is tied together with twine or wire (23) which is automatically installed by a tying mechanism (24) adapted from conventional bale making machines such as tying mechanisms used on 336 series balers manufactured by John Deere, and illustrated and described in operation pages 11 and 12 of an operator's manual, wherein the relative motions are illustrated and described between: a twine disk; twine holder; a needle; a knife arm, and a billhook.

A pickup or delivery mechanism (22) may also be incorporated by adapting them from conventional systems.

While the preferred form of the invention has been illustrated and described, it should be understood that changes may be made without departing from the principles thereof, accordingly the invention is to be limited by the literal interpretation of the claims appended hereto.

I claim:

1. A bale forming apparatus to compress loose fibrous materials such as agricultural crops and industrial products into substantially rectangular bales which are held together by twine, wire or the like, said bale forming apparatus comprising; a structural frame, a substantially rectangular bale forming chamber, and a feeder-compactor mechanism, said substantially rectangular bale forming chamber having its bottom boundary surface as an open intake port to receive the fibrous material, and being mounted on the structural frame of the apparatus allowing its reversing oscillating motion in a vertical plane relative to said feeder-compactor mechanism, suitable power transmission means to oscillate the said substantially rectangular bale forming chamber, said feeder-compactor mechanism consisting of; a plurality of feeder-compactor roller assemblies to receive, partially compress and transfer the loose fibrous material into said bale forming chamber, said bale forming chamber and said feeder-compactor mechanism remaining in sufficiently close vicinity relative to each other during the reversing oscillating relative motion of said bale forming chamber to assure the transfer, deposition and compression of said fibrous material in said bale forming chamber in folded-like layers, each of said feeder-compactor roller assemblies comprising; a shaft rotatably mounted on a common frame, and a substantially cylindrical axially extending roller body securely mounted on said shaft to receive rotational drive, said shafts of said feeder-compactor roller assemblies being held substantially parallel to each other and substantially perpendicular to the direction of said reversing oscillating relative motion between said bale forming chamber and said feeder-compactor mechanism, a power transmission means connecting and operating said shafts of said feeder-compactor roller assemblies to cause the simultaneous rotation of each of said feeder-compactor roller assemblies in identical directions, said bale forming chamber and said feeder-compactor roller assemblies being interconnected by a plurality of flexible members to cause the simultaneous and reversing rotational motion of said feeder-compactor roller assemblies as said bale forming chamber performs its reversing oscillating motion, said plurality of flexible members being extended between properly selected structural members of said bale forming chamber and the rotational boundary surfaces of said feeder-compactor roller assemblies nearest to the point of attachment of said flexible members to said structural member of said bale forming chamber, said plurality of flexible members parially covering said intake port of said bale forming chamber to prevent the undesirable exiting of said fibrous material already deposited in said bale forming chamber, a tying mechanism to tie together the fibrous material deposited in the bale, before this said compressed fibrous material is discharged from said bale forming chamber through said intake port, after the release of at least one set of said plurality of flexible members, a latching mechanism and a linkage system, both secured to the said substantially rectangular bale forming chamber and which are operated together to cause the release of said selected structural member of said bale forming chamber to thereby cause the said release of at least one set of the plurality of flexible members.

2. A bale forming apparatus to compress loose fibrous materials such as agricultural crops and industrial products into substantially rectangular bales which are held together by twine, wire or the like, said bale forming apparatus comprising; a structural frame, a substantially rectangular bale forming chamber, and a feeder-compactor mechanism, said substantially rectangular bale forming chamber having its bottom boundary surface as an open intake port to receive the fibrous material, and being journally mounted on the said structural frame of the apparatus allowing its motion in a vertical plane relative to said feeder-compactor mechanism, said bale forming chamber being held stationary on said structural frame of the apparatus during the bale forming process, said feeder-compactor mechanism being movably mounted on said structural frame of the apparatus allowing its reversing oscillating motion relative to said bale forming chamber during the bale forming process, a power transmission means to cause the reversing oscillating motion of said feeder-compactor mechanism during the bale forming process, said feeder-compactor mechanism consisting of; a plurality of feeder-compactor roller assemblies to receive, partially compress and transfer the loose fibrous material into said bale forming chamber, said bale forming chamber and said feeder-compactor mechanism remaining in sufficiently close vicinity relative to each other during the reversing oscillating relative motion of said feeder-compactor mechanism to assure the transfer, deposition and compression of said fibrous material in said bale forming chamber in folded-like layers, each of said feeder-compactor roller assemblies comprising; and shaft rotatably mounted on a common frame, and a substantially cylindrical axially extending roller body securely mounted on said shaft to receive rotational drive, said shafts of said feeder-compactor roller assemblies being held substantially parallel to each other and substantially perpendicular to the direction of said reversing oscillating relative motion of said feeder-compactor mechanism, a power transmission means connecting and operating said shafts of said feeder-compactor roller assemblies in identical directions, said bale forming chamber and said feeder-compactor roller assemblies being interconnected by a plurality of flexible members to cause the simultaneous and reversing rotational motion of said feeder-compactor roller assemblies as said feeder-compactor mechanism performs its reversing oscillating motion relative to said stationary bale forming chamber, said plurality of flexible members being extended between properly selected structural members of said bale forming chamber and the rotational boundary surfaces of said feeder-compactor roller assemblies nearest to the point of attachment of said flexible members to said structural members of said bale forming chamber, said plurality of flexible members partially covering said intake port of said bale forming chamber to prevent the undesirable exiting of said fibrous material already deposited in said bale forming chamber, a tying mechanism to tie together the fibrous material already deposited in the bale, before said compressed fibrous material is discharged from said bale forming chamber through said intake port, after the release of at least one set of said plurality of flexible members, a latching mechanism and a linkage system, both secured to said substantially rectangular bale forming chamber and which are operated together to cause the release of said selected structural member of said bale forming chamber to thereby cause the said release of at least one set of the plurality of flexible members, a suitable power transmission means to move the said intake port of said bale forming chamber away from the said feeder-compactor mechanism by causing the rearward swinging motion of said bale forming chamber thereby allowing the discharge of the finished bale.

3. A bale forming apparatus to compress loose fibrous materials such as agricultural crops and industrial products into substantially rectangular bales which are held together by twine, wire or the like, said bale forming apparatus comprising; a structural frame, a substantially rectangular bale forming chamber, and a feeder-compactor mechanism, said substantially rectangular bale forming chamber having its bottom boundary surface as an open intake port to receive the fibrous material, and being journally mounted on the said structural frame of the apparatus allowing its oscillating motion in a vertical plane relative to the said feeder-compactor mechanism, said feeder-compactor mechanism consisting of; a plurality of feeder-compactor roller assemblies to receive, partially compress and transfer the loose fibrous material into said bale forming chamber, each of said feeder-compactor roller assemblies comprising; a shaft rotatably mounted on a common frame, and a substantially cylindrical axially extending roller body securely mounted on said shaft to receive rotational drive, said shafts of said feeder-compactor roller assemblies being held substantially parallel to each other and substantially perpendicular to the direction of said oscillating motion of the said bale forming chamber, a power transmission means connected and operating said shafts of said feeder-compactor roller assemblies in identical directions, said plurality of feeder-compactor roller assemblies being power driven by suitable power transmission means causing the reversing rotational motion of said feeder-compactor roller assemblies, said bale forming chamber and said feeder-compactor roller assemblies being interconnected by a plurality of flexible members to cause the simultaneous reversing oscillating motion of said bale forming chamber as said feeder-compactor roller assemblies perform their reversing rotational motion, said plurality of flexible members being extended between properly selected structural members of said bale forming chamber and the rotational boundary surfaces of the said feeder-compactor roller assemblies nearest to the point of attachment of said flexible members to the said structural members of said bale forming chamber, said plurality of flexible members partially covering said intake port of said bale forming chamber preventing the undesirable exiting of said fibrous material already deposited in the bale forming chamber, a tying mechanism to tie together the fibrous material deposited in the bale, before said compressed fibrous material is discharged from said bale forming chamber through said intake port, after the release of at least one set of said plurality of flexible members, a latching mechanism and a linkage system, both secured to said substantially rectangular bale forming chamber and which are operated together to cause the release of said structural member of said bale forming chamber to thereby cause the release of at least one set of the plurality of flexible members.

4. A bale forming apparatus to compress loose fibrous materials such as agricultural crops and industrial products into substantially rectangular bales which are held together by twine, wire or the like, said bale forming apparatus comprising; a structural frame, a substantially rectangular bale forming chamber, and a feeder-compactor mechanism, said substantially rectangular bale forming chamber having its bottom boundary surface as an open intake port to receive the fibrous material, and being journally mounted on the said structural frame of said apparatus allowing its reversing oscillating motion in a vertical plane relative to said feeder-compactor mechanism, suitable power transmission means to oscillate the said substantially rectangular bale forming chamber, said feeder-compactor mechanism being movably mounted on the said structural frame of the apparatus allowing its reversing oscillating motion relative to said bale forming chamber, a suitable power transmission means to cause the reversing oscillating motion of said feeder-compactor mechanism during the bale forming process, said feeder-compactor mechanism consisting of; a plurality of feeder-compactor roller assemblies to receive, partially compress and transfer the loose fibrous material into said bale forming chamber, said bale forming chamber and said feeder-compactor mechanism remaining in sufficiently close vicinity relative to each other during their reversing oscillating motion to assure the transfer, deposition and compression of the fibrous material in said bale forming chamber in folded-like layers, said bale forming chamber and said feeder-compactor mechanism perform simultaneous but opposing reversing oscillating motions relative to each other during the bale forming process, each of said feeder-compactor roller assemblies comprising; a shaft rotatably mounted on a common frame, and a substantially cylindrical axially extending roller body securely mounted on said shaft to receive rotational drive, said shafts of said feeder-compactor roller assemblies being held substantially parallel to each other and substantially perpendicular to the direction of said reversing oscillating motion between said bale forming chamber and said feeder-compactor mechanism, a power transmission means connecting and operating said shafts of said feeder-compactor roller assemblies to cause the simultaneous rotation of each of said feeder-compactor roller assemblies in identical directions, said bale forming chamber and said feeder-compactor roller assemblies being interconnected by a plurality of flexible members, said flexible members being extended between properly selected structural members of said bale forming chamber and the rotational boundary surfaces of said feeder-compactor roller assemblies nearest to the point of attachment of said flexible members to said structural members of said bale forming chamber, said plurality of flexible members partially covering said intake port of said bale forming chamber preventing the undesirable exiting of the fibrous material already deposited in said bale forming chamber, said plurality of flexible members being partially wrapped and securely attached to the rotational boundary surfaces of said feeder-compactor roller assemblies, and also being securely attached to said selected structural members of said bale forming chamber cause the reversing rotational motion of said feeder-compactor roller assemblies as said bale forming chamber and said feeder-compactor mechanism perform their simultaneous but opposing reversing oscillating relative motions, a tying mechanism to tie together the fibrous material deposited in the bale, before this said compressed fibrous material is discharged from said bale forming chamber through said intake port, after the release of at least one set of said plurality of flexible members, a latching mechanism and a linkage system, both secured to the said substantially rectangular bale forming chamber and which are operated together to cause the release of said selected structural member of said bale forming chamber to thereby cause the release of at least one set of the plurality of flexible members.

5. A bale forming apparatus of claim 1 or any one of claims 2, 3, 4, wherein the said linkage system is pivotally connected at one of its ends to the said bale forming chamber and securely connected at the other of its ends to the said selected structural member of said bale forming chamber and a hook is permanently attached to the said linkage system, and the said latching mechanism is pivotally connected to the said bale forming chamber for movement in one direction to release the said hook and in the other direction to secure the hook, and thereby to likewise either release or secure the said set of the plurality of flexible members with respect to the discharge of the said finished and tied bale of fibrous material and preparing to form another bale.

* * * * *